United States Patent
Minks et al.

(10) Patent No.: US 6,309,559 B1
(45) Date of Patent: Oct. 30, 2001

(54) SILICATE-, BORATE-AND PHOSPHATE-FREE COOLING FLUIDS BASED ON GLYCOLS AND HAVING IMPROVED CORROSION BEHAVIOR

(75) Inventors: Peter Minks, Altötting; Johann Schuster, Kastl, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/607,818

(22) Filed: Jun. 30, 2000

(30) Foreign Application Priority Data

Jul. 2, 1999 (DE) .............................. 199 30 682

(51) Int. Cl.$^7$ .............................. C09K 5/00; C09K 5/08
(52) U.S. Cl. ................................ 252/75; 252/76
(58) Field of Search ......................... 252/75, 76

(56) References Cited

U.S. PATENT DOCUMENTS

| | | | |
|---|---|---|---|
| 5,300,247 | 4/1994 | Emerich et al. | 252/77 |
| 5,366,651 | * 11/1994 | Maes et al. | 252/76 |
| 5,454,967 | * 10/1995 | Pfitzner et al. | 252/78.5 |
| 6,080,331 | 6/2000 | Meszaros et al. | 252/79 |
| 6,126,852 | * 10/2000 | Turcotte et al. | 252/76 |

FOREIGN PATENT DOCUMENTS

| | | |
|---|---|---|
| 196 25 962 | 1/1998 | (DE) . |
| 0 398 284 | 11/1930 | (EP) . |
| 0 035 834 | 9/1981 | (EP) . |
| 0 816 467 | 7/1998 | (EP) . |

OTHER PUBLICATIONS

Derwent Abstract No. 1997–320997, abstract of Spain Patent Application No. 2138393 (Jan. 2000).*
Derwent Patent Family Abstract for EP 0 816 467 (Jan. 1998).
H.D. Heidt, Kühlwasser, 2. Auflage, S. 213–225, 1977 (No Month).
PCT Search Report (Oct. 2000).
Derwent Patent Family Abract for JP 06 166867, XP–002148001 (Jun. 1994).

* cited by examiner

*Primary Examiner*—Anthony Green
(74) *Attorney, Agent, or Firm*—Susan S. Jackson; Scott E. Hanf

(57) ABSTRACT

The invention relates to a coolant concentrate comprising
  a) from 0.1 to 6% by weight of at least one monocarboxylic and/or dicarboxylic acid having from 4 to 16 carbon atoms in the form of alkali metal salts,
  b) from 0.02 to 2% by weight of a triazinetriiminocarboxylic acid in the form of its alkali metal salt,
  c) from 0.02 to 2% by weight of at least one hydrocarbon triazole,
  d) from 0.01 to 1% by weight of at least one soluble alkaline earth metal salt,
  e) if desired, up to 4% by weight of water, and
  f) glycols to 100% by weight,
in each case based on the total weight of the concentrate.

8 Claims, No Drawings

SILICATE-, BORATE-AND PHOSPHATE-FREE COOLING FLUIDS BASED ON GLYCOLS AND HAVING IMPROVED CORROSION BEHAVIOR

FIELD OF THE INVENTION

The present invention relates to a novel cooling fluid based on glycols which is free of silicates, contains no phosphates, nitrites, borates or amines and displays excellent corrosion inhibition toward various metallic materials.

BACKGROUND OF THE INVENTION

To provide frost-safe cooling of engineering equipment, in particular of motor vehicle engines, use is made, as is known, of liquids based on glycols, especially ethylene glycol andlor propylene glycol. In order to protect the materials of the cooling system against corrosion, these liquids contain effective amounts of one or more corrosion inhibitors. For use in cooling systems, they are diluted with water and are intended to provide not only protection against freezing and corrosion but also good heat removal. Modern internal combustion engines subject the cooling medium to more severe operating conditions because of the higher temperatures of the metal surfaces, the increased flow rate of the cooling medium and the choice of materials. The increased use of light alloys based on aluminum together with steel, cast iron, brass, copper and soft solder in a mixed construction mode also requires careful matching of the inhibitor combination used. In recent decades, innumerable combinations of this type have been described in the relevant patent literature, so that numerous inhibitor systems having specific mechanisms of action are known. Thus, the previously customary nitrite- and silicate-containing combinations comprising nitrites, nitrates, borates, phosphates, benzoates, triazoles and silicates (e.g. H. D. Held, Kuhlwasser, $2^{nd}$ edition, pp. 213–225 (1977)) have been replaced by nitrite-free preparations generally based on monocarboxylic and dicarboxylic acids (e.g. EP-A-0 035 834), but these still contained silicates as effective aluminum inhibitors, even if in stabilized form.

It has long been known that borates can greatly impair the corrosion performance of aluminum under heat transfer conditions. Silicates can prevent this, so that a balanced ratio can be achieved under optimal conditions. In practice, it has been found that certain operating conditions can lead to a reduction in the silicate content, e.g. due to precipitation of insoluble silicate modifications at very high temperatures, even when the silicates are stabilized, for example by means of organosilicon compounds. This led to the development of silicate-free formulations which have a significantly longer life since they do not have this disadvantage; see EP-A-0 816 467.

SUMMARY OF THE INVENTION

It is an object of the present invention to find inhibitor systems for coolants which do not use borates and silicates and nevertheless provide good corrosion protection of the metals used in modern engines, in particular aluminum and iron materials, when the metal surface is subjected to high temperatures.

DESCRIPTION OF THE PREFERRED EMBODIMENTS

The invention accordingly provides a coolant concentrate comprising a) from 0.1 to 6% by weight of at least one monocarboxylic and/or dicarboxylic acid having from 4 to 16 carbon atoms in the form of alkali metal salts, b) from 0.02 to 2% by weight of a triazinetriiminocarboxylic acid in the form of its alkali metal salt, c) from 0.02 to 2% by weight of at least one hydrocarbon triazole, d) from 0.01 to 1% by weight of at least one soluble alkaline earth metal salt, e) if desired, up to 4% by weight of water, and f) glycols to 100% by weight, in each case based on the total weight of the concentrate.

The present invention further provides ready-to-use aqueous coolant compositions which contain, depending on the desired degree of protection against freezing, water in amounts of from 10 to 90% by weight, preferably from 20 to 60% by weight, and the coolant concentrate of the invention to 100% by weight.

The cooling fluid of the invention contains no alkali metal phosphates, no alkali metal molybdates, alkali metal borates and alkali metal nitrites, and also no amines.

Monocarboxylic acids used are particularly preferably branched and/or unbranched aliphatic monocarboxylic acids having a chain length of from 5 to 12 carbon atoms, e.g. pentanoic acid, hexanoic acid, octanoic acid, 2-ethylhexanoic acid, nonanoic acid, isononanoic acid, decanoic acid, undecanoic acid and dodecanoic acid. Suitable dicarboxylic acids are, in particular, those having from 4 to 12 carbon atoms, in particular from 8 to 12 carbon atoms, e.g. suberic acid, azelaic acid, sebacic acid, undecanedioic acid, dodecanedioic acid, phthalic acid or terephthalic acid.

The abovementioned monocarboxylic and dicarboxylic acids can, as described in the prior art, also be used as mixtures, usually in a ratio of from 1:99 to 99:1. The carboxylic acids used may additionally contain hydroxyl groups and/or ether oxygen atoms or carboxyl functions. The carboxylic acids in question are generally in the form of alkali metal salts, e.g. of sodium, potassium or lithium, or as ammonium salts. Monocarboxylic and dicarboxylic acids are preferably present in an amount of from 1 to 5% by weight, in particular from 2 to 4% by weight, in the coolant concentrate of the invention.

The triazinetriiminocarboxylic acid can have terminal carboxylic acid groups having a chain length of from $C_2$ to $C_{10}$, in particular $C_6$. The latter is commercially available under the name Irgacor® L 190. Particular preference is given to 6,6',6"-(1,3,5-triazine-2,4,6-triyltriimino) trihexanoic acid, which is used as an alkali metal salt. The triazinetriiminocarboxylic acid is preferably present in an amount of from 0.1 to 1% by weight, in particular from 0.1 to 0.5% by weight, in the coolant concentrate of the invention.

Alkaline earth metal salts are used as additional inhibitor. Particular preference is given to water-soluble magnesium and/or calcium salts of various inorganic acids, e.g. magnesium nitrate, calcium nitrate, in ratios of from 0:100 to 100:0. The alkaline earth metal salts are preferably present in an amount of from 0.05 to 0.8% by weight, in particular from 0.1 to 0.5% by weight, in the coolant concentrate of the invention.

Triazoles used are hydrocarbon triazoles, in particular benzotriazole and/or tolyltriazole or derivatives thereof. The triazoles are preferably present in an amount of from 0.05 to 1% by weight, in particular from 0.1 to 0.5% by weight, in the coolant concentrate of the invention.

As ethylene glycols and/or propylene glycols having from 1 to 3 oxyethylene or oxypropylene units, preference is given to using ethylene glycol, diethylene glycol, propylene glycol and/or dipropylene glycol. Particular preference is given to ethylene glycol and/or propylene glycol. They form the main constituent of the cooling fluid of the invention. They are generally present in a proportion of from 90 to 98% by weight, preferably from 92 to 95% by weight, based on the weight of the coolant concentrate.

A particularly preferred cooling fluid according to the invention comprises, for example:

a) 2–5% by weight of 2-ethylhexanoic acid, sodium salt b) 0.1–0.3% by weight of triazinetriyltriiminotrihexanoic acid, sodium salt c) 0.05–0.3% by weight of benzotriazole and/or tolyltriazole d) 0.02–0.2% by weight of magnesium nitrate hexahydrate e) balance: ethylene glycol and/or propylene glycol together with, if desired, from 1 to 3% by weight of water as solubilizer.

In addition to the specified components a) to e), the coolant concentrate of the invention may further comprise appropriate additives such as alkali metal nitrates, hard water stabilizers (e.g. polyacrylic acid-maleic acid copolymers), antifoams, anticavitation agents, denaturants and dyes. The pH of the mixture of the invention is usually in the range 7–10, in particular 7.5–9, measured in an aqueous dilution of 1:2. It is adjusted by addition of alkalis, in particular aqueous sodium hydroxide or potassium hydroxide solution.

EXAMPLES

The invention is illustrated with the aid of Examples A–E and the comparative example.

Table I below lists various coolant systems according to the invention which were made up by mixing the specified components. It also contains the comparative example.

The comparative example shown in Table I is a commercial silicate-free coolant/antifreeze according to the prior art as described in EP-A-0 816 467.

The anticorrosion action of the coolant system of the invention and that of the comparative example according to the nearest prior art was tested in accordance with ASTM D 1384–94 and by means of a hot corrosion test. The ASTM D 1384 method is a static screening test in which the metals to be tested are heated in a cooling fluid. In this test, the test metals acquire the temperature of the liquid. To make the above test more severe, it was carried out at a test concentration of 20% by volume in order to demonstrate the inhibition advantages, particularly in respect of steel and cast iron. In the hot corrosion test in accordance with the FVV (=Forschungsvereinigung für Verbrennungskraftmaschinen), leaflet R 443, the present fluids were tested using cast aluminum $AlSi_{10}Mg$ wa which had been heated to a temperature of 150° C. as metal. The test was carried out under conditions of increased severity compared to the abovementioned FVV test: temperature of the liquid=95/105° C., test time=48 hours, concentration=20% by volume, circulation rate=3.5 l/min, heat flux=80 $W/cm^2$.

Evaluation was carried out by weighing the cleaned test specimens before and after the test procedure. The aim is to achieve as little as possible deposition on or loss of the test metal.

The results of these corrosion studies are summarized in Table II.

As the results show, coolant compositions according to the invention provide significantly improved corrosion protection to the metals than does the prior art fluid also tested for comparison. This surprisingly applies both to iron and steel in the ASTM test D1384 and to light alloys (aluminum alloys) in the hot corrosion test under heat transfer conditions. The unexpectedly good corrosion protection could be due to a synergistic effect which is achieved by precisely the formation according to the invention.

TABLE I

| | Composition of the coolants (% by weight) | | | | | |
|---|---|---|---|---|---|---|
| Component | Comparative Example | Example A | Example B | Example C | Example D | Example E |
| Benzoic acid, Na salt | 0.15 | — | — | 1.50 | — | — |
| 2-Ethylhexanoic acid, Na salt | 4.10 | 3.92 | 3.92 | — | — | — |
| Dodecanoic acid, Na salt | — | — | — | 3.00 | — | — |
| Azelaic acid, Na salt | — | — | — | — | 3.10 | — |
| Sebacic acid, Na salt | — | — | — | — | — | 1.70 |
| Isononanoic acid, Na salt | — | — | — | — | — | 3.40 |
| Irgacor ® L 190 (50% WS) | — | 0.20 | 0.40 | 0.40 | 0.40 | 0.30 |
| Tolyltriazole | 0.20 | 0.20 | 0.20 | 0.20 | 0.10 | 0.20 |
| Benzotriazole | — | — | — | — | 0.10 | — |
| $Mg(NO_3) * 6H_2O$ | — | 0.05 | 0.05 | 0.03 | 0.15 | 0.08 |
| Monoethylene glycol | Balance to 100 | Balance to 100 | Balance to 100 | Balance to 100 | Balance to 100 | Balance to 100 |

TABLE II

Results of the corrosion tests

| ASTM D1384-94 c = 20% v/v weight change in g/m² | Comparative Example | Example A | Example B | Example C | Example D | Example E |
|---|---|---|---|---|---|---|
| Copper | −0.7 | −0.4 | −1.0 | −0.6 | −0.3 | −0.9 |
| Soft solder WL 30 | −2.9 | −3.9 | −4.5 | −6.0 | −11.0 | −10.3 |
| Brass | −0.5 | −0.3 | −0.6 | −1.3 | −0.7 | −1.0 |
| Steel | −10.0 | −1.8 | −0.7 | +0.2 | +0.1 | −0.1 |
| Cast iron | −11.5 | −1.3 | −0.8 | +0.2 | −0.1 | −1.7 |
| AlSi$_6$Cu$_3$ | −7.5 | −9.4 | −8.7 | −9.9 | −9.5 | −7.3 |
| Hot corrosion in accordance with FVV, modified, heated test disk of AlSi$_{10}$Mg wa c = 20% v/v, T = 95° C. | Comparative Example | Example A | Example B | Example C | Example D | Example E |
| Weight change in mg | −100.6 | −8.9 | −9.3 | −25.7 | −15.1 | −7.0 |

What is claimed is:

1. A coolant concentrate comprising
   a) from 0.1 to 6% by weight of at least one monocarboxylic acid having from 4 to 16 carbon atoms in the form of alkali metal salts, at least one dicarboxylic acid having from 4 to 16 carbon atoms in the form of alkali metal salts, or a combination thereof,
   b) from 0.02 to 2% by weight of a triazinetriiminocarboxylic acid in the form of its alkali metal salt,
   c) from 0.02 to 2% by weight of at least one hydrocarbon triazole,
   d) from 0.01 to 1% by weight of at least one soluble alkaline earth metal salt,
   e) optionally, up to 4% by weight of water, and
   f) a glycol to 100% by weight,
in each case based on the total weight of the concentrate.

2. A coolant concentrate as claimed in claim 1, wherein the monocarboxylic acids have from 5 to 12 carbon atoms.

3. A coolant concentrate as claimed in claim 1, wherein the dicarboxylic acids have from 4 to 12 carbon atoms.

4. A coolant concentrate as claimed in claim 1, wherein the triazinetriiminocarboxylic acid has terminal carboxylic acid groups having a chain length of from $C_2$ to $C_{10}$.

5. A coolant concentrate as claimed in claim 1, wherein the hydrocarbon triazole is a benzotriazole, a tolyltriazole, a derivative of a benzotriazole or a derivative of a tolyltriazole.

6. A coolant concentrate as claimed in claim 1, wherein the alkaline earth metal salt is a calcium and/or magnesium salt.

7. A coolant concentrate as claimed in claim 1, wherein the glycol is an ethylene glycol and/or propylene glycol having from 1 to 3 ethoxy or propoxy units.

8. A coolant comprising from 10 to 90% by weight of water and a coolant concentrate as claimed in claim 1 to 100% by weight.

* * * * *